No. 786,411. PATENTED APR. 4, 1905.
H. H. CUTLER.
MAGNETIC CLUTCH OR SPEED ACCELERATOR.
APPLICATION FILED AUG. 5, 1903.

Witnesses:
Ira D. Perry
F. B. Weir

Inventor:
Henry H. Cutler
by Jones & Addington
attys

No. 786,411. PATENTED APR. 4, 1905.
H. H. CUTLER.
MAGNETIC CLUTCH OR SPEED ACCELERATOR.
APPLICATION FILED AUG. 5, 1903.

Witnesses:
Ira D. Perry
J. B. Weir

Inventor:
H. H. Cutler
by Jones & Addington
attys.

No. 786,411. PATENTED APR. 4, 1905.
H. H. CUTLER.
MAGNETIC CLUTCH OR SPEED ACCELERATOR.
APPLICATION FILED AUG. 5, 1903.

Witnesses:

Inventor:
H. H. Cutler
by Jones & Addington
Attys

No. 786,411. PATENTED APR. 4, 1905.
H. H. CUTLER.
MAGNETIC CLUTCH OR SPEED ACCELERATOR.
APPLICATION FILED AUG. 5, 1903.

Witnesses:
Ira D. Perry
JB Weir

Inventor:
Henry H. Cutler
by Jones & Addington
Attys

No. 786,411.

Patented April 4, 1905.

UNITED STATES PATENT OFFICE.

HENRY H. CUTLER, OF MILWAUKEE, WISCONSIN, ASSIGNOR TO ARNOLD MAGNETIC CLUTCH COMPANY, OF MILWAUKEE, WISCONSIN, A CORPORATION OF WISCONSIN.

MAGNETIC CLUTCH OR SPEED-ACCELERATOR.

SPECIFICATION forming part of Letters Patent No. 786,411, dated April 4, 1905.

Application filed August 5, 1903. Serial No. 168,388.

*To all whom it may concern:*

Be it known that I, HENRY H. CUTLER, a citizen of the United States, residing at Milwaukee, in the county of Milwaukee and State of Wisconsin, have invented a certain new and useful Improvement in Magnetic Clutches or Speed-Accelerators, of which the following is a full, clear, concise, and exact description, reference being had to the accompanying drawings, forming a part of this specification.

My invention relates to a magnetic clutch or speed-accelerator, my object being to provide an electromagnetic element whereby a driven part may be rotated at any desired speed equal to or less than that of the driving part.

Magnetic clutches have heretofore been produced of various forms; but they have principally been used for starting purposes to take the place of the ordinary mechanical clutch. These magnetic clutches usually consist of an annular field-magnet carrying an annular slot within which the magnetic winding is placed, the armature being adapted to engage the surfaces of the field-magnet upon opposite sides of the winding. In clutches of this class the magnetic field produced by the winding serves to attract the armature forcibly toward the field-magnet, and the driven part is caused to quickly assume the speed of the driving part due to the friction produced by the magnetic attraction. Magnetic clutches of this class have gone into commercial use to a limited extent. Also it has been proposed heretofore to construct clutches operating upon the induction principle, the torque or turning effort exerted upon the driven part being due to eddy-currents induced by the relative movement of the armature and the field-magnet. Clutches of this type have not become commercial, due to their inefficiency and failure to meet practical requirements. Moreover, since the inductive effect is dependent upon a difference of relative speed between the driving and the driven part it is impossible by induction alone to bring the driven part to the speed of the driving part.

In accordance with the present invention I have produced a magnetic clutch or accelerator which is highly efficient in operation, which may be utilized as a starting device completely under the control of the operator or attendant, and which may also be used as a speed-varying device to cause the driven part to rotate for prolonged periods at any desired speed less than the normal. When employed as a starting device or as an accelerator in which it is desired to bring the speed of the driven part to that of the driving part, I utilize both induction and friction for producing the torque or turning effort. The inductive effect is sufficient to start the driven part from rest and to accelerate the same to a speed somewhat less than full speed; but inasmuch as the inductive effect is dependent upon the relative movement of the driving and driven parts it is impracticable to bring the driven part to full speed through the influence of induction alone. I therefore utilize the frictional effect in bringing the driven part to full speed. It is apparent that the frictional effect may be utilized in a number of ways. For instance, the full frictional effect may be employed continuously throughout the period of starting, and this particular embodiment of the invention is covered by claims of the present application, or a portion only of the frictional effect may be utilized continuously, the remaining portion being counterbalanced or eliminated through mechanical or electrical means—as, for instance, a spring or a balancing coil or winding. This modification, wherein a portion only of the frictional effect is utilized continuously, forms the subject-matter of an application filed by me July 23, 1903, Serial No. 166,702. Again, the inductive effect alone may be utilized for starting the driven part from rest and for accelerating the same to a prearranged speed, after which the full frictional effect may be thrown into action to bring the driven part to full speed, the frictional effect being eliminated during the earlier period of acceleration by mechanical means—as, for instance, a spring—or by electromagnetic means—as, for instance, a balancing coil or winding. This modification forms the subject-matter of an application filed by me July 2, 1904, Serial No. 215,082.

Inasmuch as the inductive effect decreases as the speed of the driven part increases, while the frictional effect is practically constant until the driven part approaches full speed when the friction of rest is brought into play, it is apparent that the clutch constructed in accordance with my invention is provided with increased turning effort at starting and at the moment of attaining full speed, precisely the points where increased turning effort is desired. Moreover, since the turning effort for a given exciting-current is of decreased value at intermediate points, I am thus afforded a means for controlling the clutch and the rate of acceleration by varying the strength of the current supplied to the clutch-winding.

I have illustrated my invention in the accompanying drawings, in which—

Like numerals refer to like parts in the several figures.

I shall describe my invention in connection with one form thereof which has been designed for practical operation, it being understood, however, that my invention is capable of other embodiments and of various modifications which will readily suggest themselves to those skilled in the art and that the essential elements of the clutch or accelerator of my invention may be altered or modified to suit changing conditions and applications.

Figure 1:
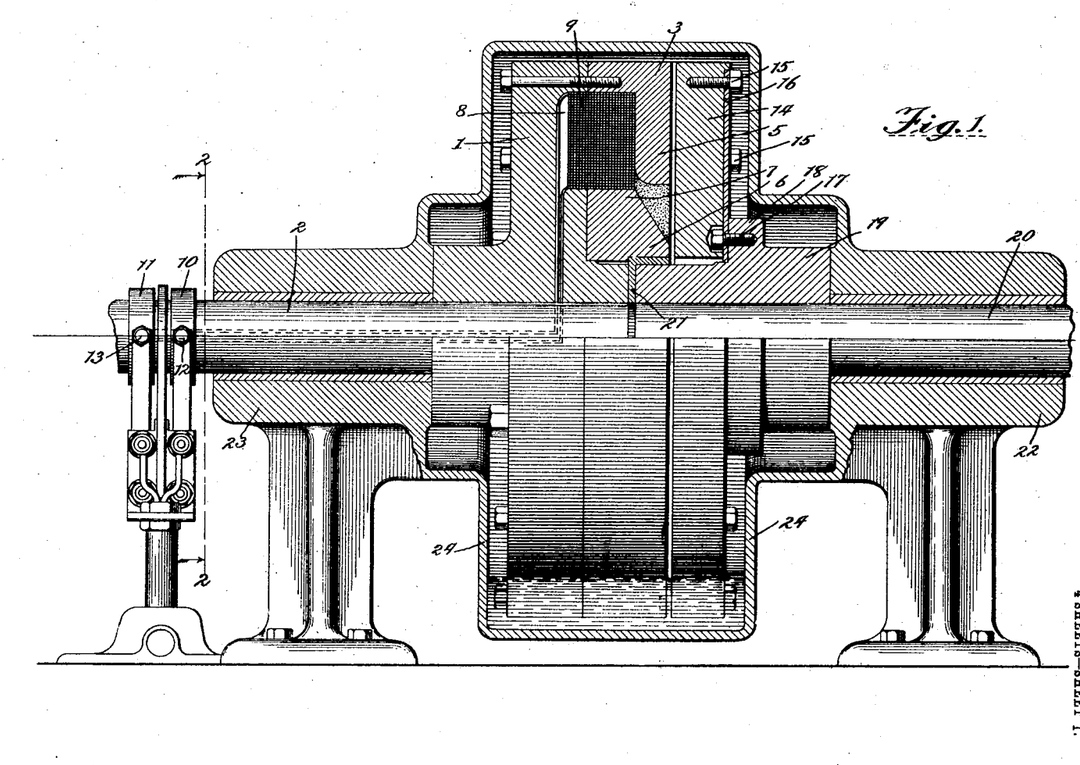
Figure 1 is a view, partially in longitudinal section, illustrating the improved clutch or accelerator of my invention.
Figure 2:
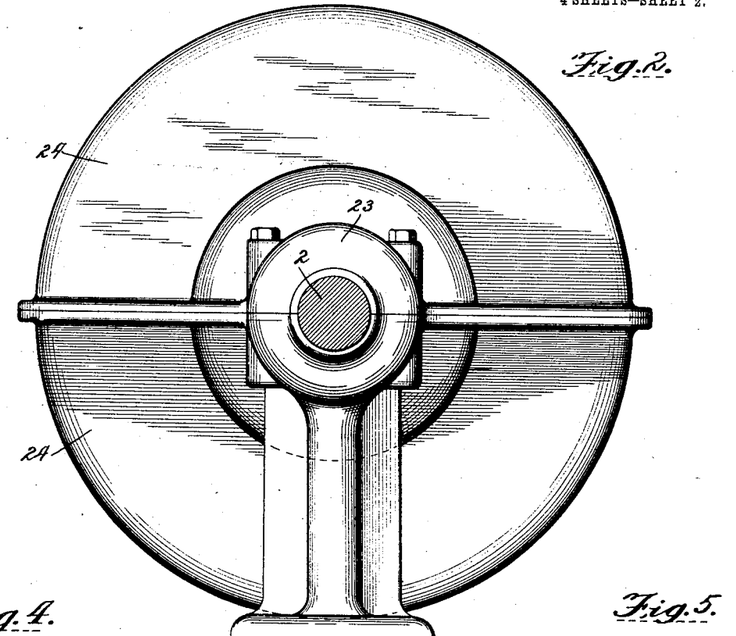
Fig. 2 is an end view thereof.
Figures 3, 4, 5:
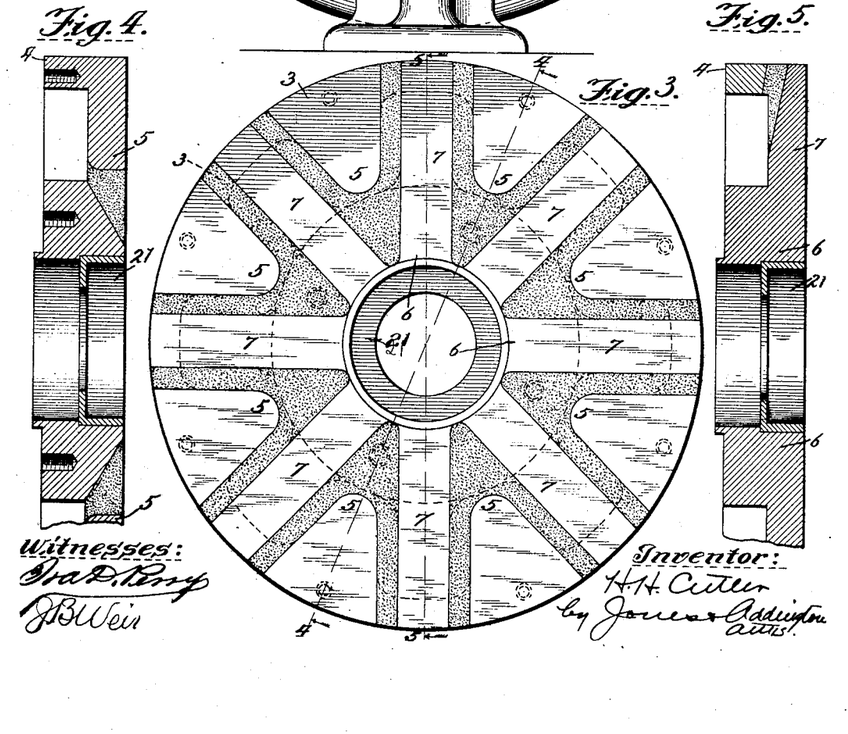
Fig. 3 is a face view of the field-magnet member of the clutch.
Fig. 4 is a sectional view through line 4 4 of Fig. 3.
Fig. 5 is a sectional view through line 5 5 of Fig. 3.
Figure 6:
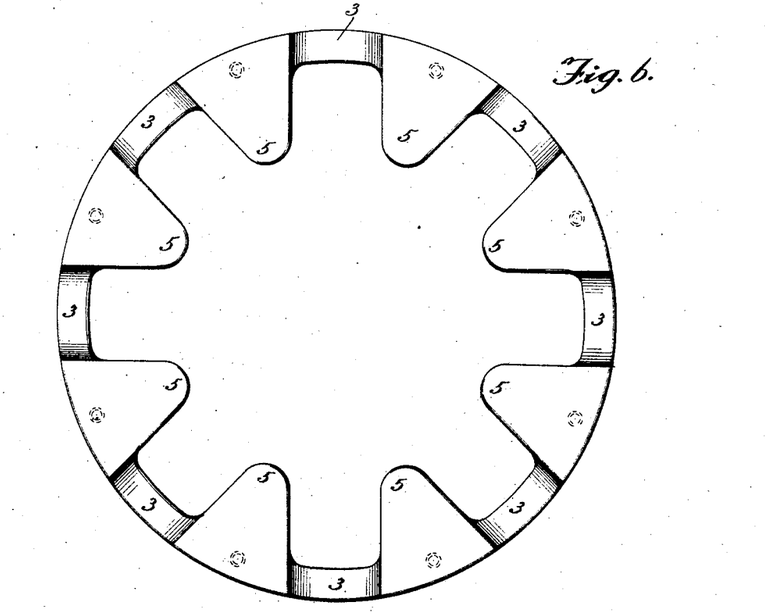
Fig. 6 is a view of one of the parts which compose the field-magnet member.
Figure 7:
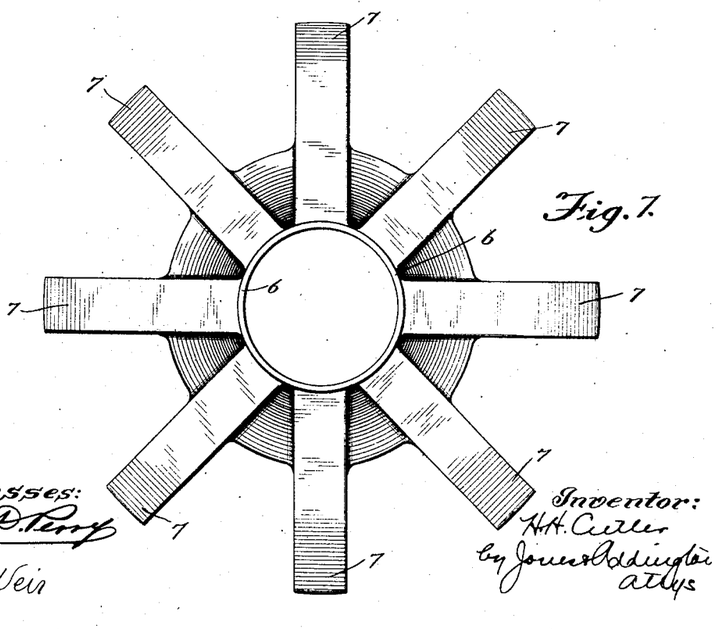
Fig. 7 is a view of another of said parts.

The field-magnet member of the clutch comprises, as illustrated, a back plate or disk 1, which is mounted upon a shaft 2. To the face of this disk or back plate two rings are secured. One of these rings, 3, is provided with a plurality of inwardly-extending pole-pieces 5 5, these pole-pieces being in the present instance substantially triangular in shape. The other ring, 6, is provided with radially-extending pole-pieces 7 7, which, as shown, are substantially rectilinear in shape and which when the rings are placed together, as shown in Figs. 1 and 3, are adapted to rest in the spaces between the triangular pole-pieces above mentioned. An annular channel 8 is provided in the face of the back plate 1, and the rings 3 and 6 when placed together form an annular channel which coöperates with the channel 8 in forming a chamber for the reception of the annular winding 9 of the clutch. The terminals of the winding or coil 9 extend through suitable openings in the back plate 1 and in the shaft 2 and are connected, respectively, with rings 10 11, upon which rest brushes 12 13, respectively, which brushes are connected with any suitable source of supply for furnishing current to the clutch-winding. The armature 14 is of annular form and in the present instance is secured, by means of bolts 15 15, to the periphery of a steel disk 16, the inner edge of which is secured, by means of bolts 17, to a flange 18, carried upon a hub 19, the hub 19 being keyed to the shaft 20. The disk 16 being of spring metal permits the armature to be drawn into mechanical contact with the magnet member as soon as current is admitted to the energizing-windings; but as soon as the windings are deënergized the disk will withdraw the armature from mechanical contact with the face of the field-magnet. A cup 21 fits in a suitable opening in the magnet member, and the end of the shaft 20 is adapted to fit in this cup, whereby the shafts 2 and 20 are held in alinement.

The spaces between the poles carried on the rings 3 and 6 are filled with Babbitt or other non-magnetic material. This material serves to entirely inclose the winding, and thus protect the same from injury and also from the oil employed for lubricating purposes. Moreover, the Babbitt metal affords, with the polar faces, a continuous frictional surface against which the face of the armature is adapted to bear. The magnet member is thus so constructed that the energizing-winding is entirely surrounded by iron. Consequently, when the circuit through said winding is completed, the current through the winding, and consequently the strength of the magnetic field in the inducing or primary member, is retarded, due to the large amount of induction. This prevents the sudden acceleration of the driven member, which has caused serious objections to the magnetic clutches of the ordinary type.

The shafts 2 and 20 are journaled in suitable bearings 22 and 23, and these bearings are preferably formed continuous with an inclosing shell 24, which serves the double purpose of excluding dust and dirt and retaining the oil. By the employment of this shell the clutch may be subjected to an oil-bath. Oil placed in the shell will be picked up by the periphery of the clutch and will be carried to the frictional surfaces between the armature and the magnet member.

Figure 8:
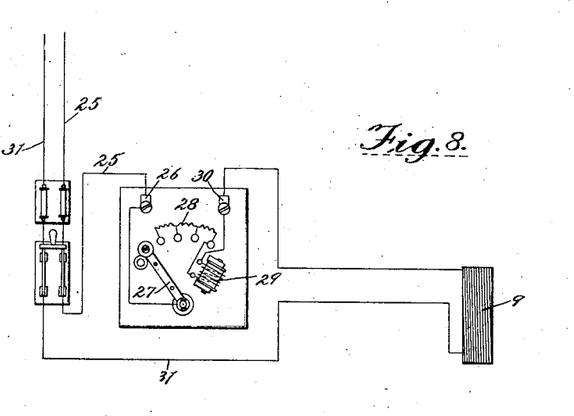
Fig. 8 is a diagram of the circuit connections.

The circuit arrangement is shown in Fig. 8. Current entering by the supply-main 25 passes through the fuse and switch by binding-post 26, thence to contact-arm 27 of the controlling-rheostat, through the resistances 28, when the contact-arm is moved to close the circuit, thence through the retaining-magnet 29 to the binding-post 30, thence through the clutch-winding 9 to the opposite supply-main 31.

Figure 9:
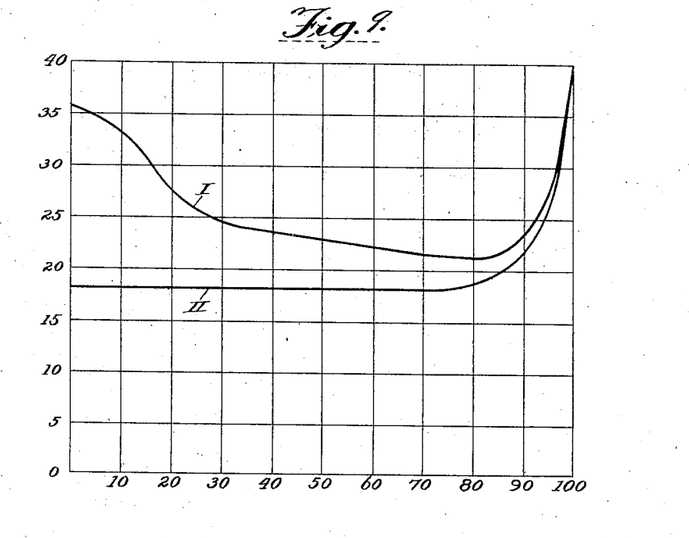
Fig. 9 is a curve illustrating the torque developed by the clutch constructed in accordance with my invention.

In Fig. 9 I have illustrated by means of a curve the variation of the torque as the speed of the driven part increases. The curve I indicates the torque due to the combined inductive and frictional effects in one of my clutches. The curve II is the curve of friction. The abscissæ of the curves are percentages of full speed, while the ordinates are torque in pounds at a one-foot radius. These curves relate to the conditions when the driving part is running at a speed of nine hundred revolutions per minute, the number of poles on the clutch being sixteen, the current being 0.12 ampere at one hundred and ten volts, the ampere-turns being two hundred and fifty. The total torque curve may be altered in form to meet different requirements by changing the exciting-powers, the number of poles, and the relative dimensions of the parts. It will be noted that in curve I the torque is maximum at starting and gradually decreases. The curve I touches curve II near full speed, which indicates that at this point the inductive effect is practically *nil*. The curve rises rapidly, almost abruptly, as full speed is approached, and this sudden rise is due to the friction of rest which is considerably greater than the friction of motion. The increased torque is thus produced at precisely the points where it is desired in practice—that is, at the time of starting the driven part from rest and at the time of bringing the driven part to full speed. The dip in the curve at intermediate points affords an excellent opportunity for the control and regulation of the rate of acceleration, permitting the attendant to gage the period of starting as desired. With the ordinary annular clutches of the prior art the period of starting is not a matter of control, and the driven part is brought rapidly, almost precipitately, to the full speed when current is admitted to the clutch-winding. With the device of the present invention current which is just sufficient to start the driven part from rest is not sufficient to accelerate the driven part to full speed, and accordingly it is necessary to increase the energizing-current in order to bring the driven part to full speed. This fact permits ready control of the period of starting.

By the employment of a rheostat, as illustrated in Fig. 8, current is first closed through a series of resistances, and current is thus admitted to the clutch-winding of sufficient strength to start the driven part from rest. Thereafter the resistance is removed step by step, as it is desired to accelerate the driven part until, when the resistance is entirely removed from circuit, the driven part is running at full speed. The retaining-magnet 29 serves to retain the switch-arm 27 in the full "on" position and when deënergized permits the arm to move to the "off" position, through the agency of a spring or other suitable means, thereby opening the circuit through the clutch-coil and bringing the driven part to rest.

By the above operation I am enabled to control the rate of acceleration of the driven member of the clutch. However, the arm of the rheostat may be moved immediately to the on position to admit full current to the energizing-windings, thereby removing all of the resistance at once without destroying the efficiency of the clutch. Due to the creation of a large amount of inductance which prevents the sudden rising of the magnetism to full strength, even though full current is admitted to the energizing-windings, the speed of the driven member will be gradually accelerated. Furthermore, in a clutch of this character the acceleration is due to the combined effects of induction and friction. The frictional effect is practically constant, while the inductional effect is uniformly decreasing, thereby resulting in a force which gradually decreases throughout the period of acceleration, which causes the rate of acceleration to be much slower than in clutches of the "ring" type.

It will be noted that during the operation of the clutch illustrated the armature rests in mechanical contact with the face of the field-magnet member, and the air-gap is thus entirely eliminated and the reluctance of the magnetic circuit is reduced to a minimum, whereby a clutch of maximum efficiency results. The elimination of the air-gap greatly increases the inductive effect, in specific instances doubling and even trebling the turning effort for a given energizing-current. A continuous frictional surface is presented to the armature, and the entire surface of the clutch is utilized as a frictional surface. In the annular clutches of the prior art, wherein the winding is placed in an annular channel in the face of the field-magnet member, only those portions of the face of the field-magnet member on opposite sides of the coil are utilized as bearing-surfaces. By the peculiar construction of the field-magnet member of the present invention, in which the polar faces overlap the magnet-winding radially, the entire surface of the clutch is utilized as a frictional or bearing surface. Moreover, since the spaces between the pole-pieces are filled with non-magnetic material a continuous frictional surface of maximum area is produced. It will be noted that the polar surfaces and the intervening non-magnetic surfaces are so disposed that there are no zones or annular rings of metal of different wearing capacity which would tend to wear the surface of the armature unevenly. On the contrary, the overlapping polar surfaces present a continuous surface radially of uniform wearing capacity.

In clutches of the annular type of the prior art, due to the fact that the channel for the winding materially decreases the available frictional surface, the pressure per square inch between the armature and field-magnet is considerable. In the construction of my invention, since I am enabled to utilize the entire surface of the clutch as a frictional surface, the pressure per square inch for a given diameter of the clutch is greatly reduced. In particular cases this reduction may be as much as one-half. Since the tendency of the contacting surfaces to cut increases with the pressure, my construction greatly reduces this tendency and likewise reduces the heating effect.

I preferably construct the magnetic portions of the field member of steel, the non-magnetic filling being of Babbitt metal, while the armature is made of cast-iron. The armature may be made of steel and the polar pieces of cast-iron, or any other combination of metals which will afford good wearing qualities may be utilized. Likewise other materials, as brass, may be substituted for the Babbitt metal.

It will be noted that by making the polar surfaces on the inner ring substantially rectilinear in form and by making the polar faces on the outer ring substantially triangular in form I am enabled to procure polar surfaces of substantially equal area disposed in the most efficient manner. The lines of force in passing from the polar faces to the armature are thus constrained to move in substantially tangential directions, and the eddy-currents induced in the armature are thus so disposed that the reacting lines of force produced thereby are substantially tangential. Inasmuch as it is the tangential components of the lines of force which tend to produce rotation, it is apparent that this disposition of the polar surfaces, wherein the lines of force are constrained to move in tangential directions, affords the maximum turning effort. Furthermore, this disposition of the polar surfaces aids in causing the members to quickly separate when the energizing-windings are deprived of current, as by the particular arrangement of the polar surfaces. The magnetic field is divided into a large number of individual magnetic circuits which aid in causing a rapid disappearance of the residual magnetism in the armature member. This is due to the fact that the magnetic flux when current is admitted to the energizing-windings will start from the poles which are arranged to have the same polarity—say the inwardly-extending pole-pieces—and pass into the armature member, dividing into two parts, which flow in opposite directions. One half of the flux will flow through the outwardly-extending pole-pieces on one side of the inwardly-extending pole-pieces, and the other half will flow through the outwardly-extending pole-piece on the opposite side and from the pole-pieces back to the starting-point. The armature member then has flux flowing in adjacent parts in opposite directions, which meet and pass down through the pole-pieces without interfering as long as the magnetizing force continues. However, as soon as this force is withdrawn by opening the circuit the two oppositely-flowing fluxes meet in the armature member in opposition to each other, and thereby neutralize each other, causing the residual magnetism to rapidly disappear.

The clutch, as illustrated in Fig. 1, is designed more particularly for starting purposes—that is, for applications wherein it is not desired to operate the clutch for a prolonged period, with the driven part running at a less speed than the driving part. For this application of the clutch as a starting device as distinguished from a speed-regulating device I find it desirable to supplement the inductive effect by the entire frictional effect. When it is desired to employ the clutch as a speed-regulating device wherein the driven part is to be operated at a less speed than the driving part for a prolonged period of time, I find it advisable to eliminate a portion of the frictional effect. It is advisable, moreover, to provide special means under such circumstances for dissipating the heat generated by the eddy-currents. The frictional effect may be reduced, as heretofore stated, by the employment of mechanical means, such as springs, or by the employment of electromagnetic means, such as a balancing coil or winding. Moreover, the balancing coil or winding may be utilized for assisting in producing the inductive effect during the period of starting. These modifications form the subject-matter of other applications, as heretofore noted; but all of them are embraced within the scope of the generic claims appended hereto.

When it is desired to employ the device as an accelerator merely—that is, as a speed-regulator—it is evident that the employment of the frictional effect is not necessary if it is never desired to bring the driven part to full speed, and in such case the inductive effect alone may be relied upon for rotating the driven part. In this case the elimination of the air-gap is preferable in order that the reluctance of the magnetic circuit may be as low as possible, and a mechanical or electromagnetic counterbalancing device may be employed for eliminating practically all the frictional effect, except such as may be necessary to maintain the armature in mechanical contact with the field member. This particular modification of my invention forms the subject-matter of my application filed July 23, 1903, Serial No. 166,702.

By the employment of a lubricant between the armature and the magnet member the danger of cutting may be diminished. I find that the employment of oil slightly reduces the torque; but the reduction is not sufficient to render the same objectionable. It is a well-known fact that oil entering between two surfaces under pressure produces a vacuum effect which causes the surfaces to adhere with greater tenacity than when the oil is absent. This vacuum effect undoubtedly accounts for the fact that the diminution in the torque is so slight when oil or other lubricant is present. I preferably employ a shell or casing around the clutch, so that the same may be immersed in an oil-bath, as illustrated, the casing also serving to exclude dust and dirt.

One of the important features of the present invention, although not an essential feature, is the provision of means whereby the air-gap is eliminated from the magnetic circuit of the clutch during the normal operation of the clutch. In prior attempts to build clutches working on the induction principle an air-gap has been present during operation, and this fact has caused such a low efficiency as to render the same uncommercial. My construction permits the building of a clutch utilizing the turning effect of induction in which there is no mechanical air-gap in the magnetic circuit.

It will be noted that my present invention embodies the method of producing a rotation of the driven member of a clutch or accelerator by creating a magnetic field in one of the clutch members, (either the driving or the driven member,) subjecting the other member to the inductive influence thereof, positively rotating one of said members (the driving member) in mechanical contact with the other member to cause said latter-mentioned member to rotate by induction. My invention is also capable of embodying the method above described, with the modification that the two members press against each other with a definite mechanical pressure, whereby the friction between the two members assists the inductive effect in rotating the driven member. It will also be noted that my invention embodies the method of producing rotation of the driven member of a clutch or accelerator wherein a magnetic field is created in one member having suitable polar surfaces, a second member being opposed thereto in mechanical contact, the lines of force being constrained to flow in substantially tangential paths in passing from pole to pole through said second member, one of said members being positively rotated, whereby the other is rotated through the influence of the inductive action, the lines of force traveling in paths which produce the maximum turning effort for a given energizing power.

It will be understood that my invention is capable of numerous embodiments which employ some or all of the advantageous features disclosed herein; but the employment of each and all such features is not essential to produce an operative and commercial device. For instance, I have referred to the advantage of eliminating the air-gap; but in my application filed April 22, 1901, Serial No. 56,999, I have shown a clutch in which the air-gap is present during the initial period of starting. While sacrificing this particular feature of advantage, this clutch nevertheless employs other valuable features of my invention. This instance illustrates the fact that it is not necessary to employ all of the features of the present invention in order to produce a clutch falling within the spirit and scope of my invention. Again, the multipolar feature of the clutch is important and lends to the high efficiency of the clutch; but this feature is not essential, although I would advise the employment thereof. Again, the disposition of the pole-pieces to overlap and cover the winding is highly advantageous, but not absolutely essential. The formation of the polar faces of triangular and rectilinear shape, respectively, is important as producing a maximum turning effect by constraining the lines of force to flow in the most advantageous paths; but this feature is not essential to an operative structure.

The above illustrations fully indicate the fact that advantageous features may be dispensed with while retaining other and important features of my invention, and I wish it understood that I have drawn the appended claims severally to the various features of invention disclosed herein, pointing out particularly in each claim the features toward which the claim is directed.

I have herein referred to the clutch member carrying the energizing-winding as the "field-magnet" member, the "primary" member," and also as the "inducing" member. I have referred to the coöperating part as the "armature," the "secondary" member, and also as the "induced" member. It will be understood that these terms are interchangeable.

It will be understood that the clutch or accelerator of the present invention is applicable for use as a brake as well as for a starting device or a speed-regulating device. When used as a brake, one of the members of the clutch, preferably the inducing member, will be mounted in a stationary position, while the other member will be suitably associated with the moving mechanism to which the brake is applied.

Having described my invention, what I claim as new, and desire to secure by Letters Patent, is—

1. The combination with a primary member having suitable energizing-windings, of a secondary member adapted to be inductively influenced thereby to create torque-producing currents in said secondary member, whereby relative movement between said primary and secondary members results, said members being axially movable relatively.

2. The combination with a primary clutch member having suitable energizing-windings, of a secondary member adapted to be inductively influenced thereby to create torque-producing currents in said secondary member, said members being adapted to rest in mechanical contact whereby air-gaps in the magnetic circuit are eliminated.

3. The combination with a primary clutch member having suitable energizing-windings, of a secondary clutch member adapted to be inductively influenced thereby to create torque-producing currents in said secondary member and frictionally engaging said first-mentioned member, whereby one of said members, the driven member, is accelerated through the combined influence of induction and friction.

4. The combination with a primary clutch member having suitable energizing-windings, of a secondary member adapted to be inductively influenced thereby, to create torque-producing currents in said secondary member, one of said members, the driven member, being accelerated through the combined and continuously-imposed effects of induction and friction.

5. The combination with a primary or inducing clutch member having suitable energizing-windings, and a plurality of polar surfaces, of a secondary or induced member adapted to be inductively influenced by said primary member to create torque-producing currents in said secondary member and capable of exerting an axial pressure upon said primary member.

6. The combination with a primary clutch member having an annular winding or windings and suitable polar surfaces, of a secondary member adapted to be inductively influenced by said primary member to create torque-producing currents in said secondary member.

7. The combination in a magnetic clutch or accelerator, of a primary member having an annular winding or windings, and suitable polar surfaces alternating in polarity which are adapted when excited by the winding to induce torque-producing current in a secondary member, and a secondary member adapted to be so inductively influenced by the said polar surfaces.

8. The combination with a primary clutch member having a plurality of radially-arranged polar surfaces alternating in polarity, of a secondary member adapted to be inductively influenced thereby to create torque-producing currents in said secondary member.

9. The combination with a primary clutch member, of a secondary member, said primary member being provided with an annular winding or windings, and with pole-pieces interposed between said windings and said secondary member, said secondary member being adapted to be inductively influenced by said primary member to create torque-producing currents in said secondary member.

10. The combination with a primary clutch member having an annular winding or windings and a plurality of radially-extending pole-pieces projecting over the same, of a secondary member adapted to be inductively influenced by said primary member to create torque-producing currents in said secondary member.

11. The combination with a clutch member having a plurality of circumferentially-disposed polar surfaces alternating in polarity, of a secondary member adapted to be inductively influenced thereby to create torque-producing currents in said member.

12. The combination with a primary clutch member having an annular winding or windings, and a plurality of circumferentially-disposed polar surfaces alternating in polarity, of a secondary member inductively influenced thereby to create torque-producing currents in said secondary member.

13. The combination with a primary clutch member having a plurality of inwardly-extending pole-pieces of one polarity, and a plurality of outwardly-extending pole-pieces of opposite polarity alternating therewith, of a secondary member adapted to be inductively influenced thereby to create torque-producing currents in said secondary member.

14. The combination with a primary clutch member having a plurality of inwardly-extending pole-pieces and a plurality of outwardly-extending pole-pieces of opposite polarity alternating therewith, said polar surfaces all lying in a common plane, of a secondary member adapted to be inductively influenced by said primary member to create torque-producing currents in said secondary member.

15. The combination with a primary member having an annular winding or windings, a plurality of inwardly-extending pole-pieces of one polarity and a plurality of outwardly-extending pole-pieces of opposite polarity alternating therewith, of a secondary member inductively influenced thereby to create torque-producing currents in said secondary member.

16. A primary member comprising an outer ring having a plurality of inwardly-extending pole-pieces, an inner ring having a plurality of outwardly-extending pole-pieces alternating therewith, an annular energizing-winding situated between said rings, and a secondary member inductively influenced by said primary member to create torque-producing currents in said secondary member.

17. A primary member comprising an outer ring having inwardly-extending pole-pieces of substantially triangular shape, an inner ring having outwardly-extending pole-pieces substantially rectangular in shape and alternating with said triangular pole-pieces, an annular winding or windings interposed between said rings, and a secondary member inductively influenced by said primary member to create torque-producing currents in said secondary member.

18. A primary member comprising a back plate, an outer and an inner ring secured thereto, the outer ring having inwardly-extending pole-pieces and the inner ring having outwardly-extending pole-pieces alternating therewith, the pole-pieces overlapping, and a secondary or induced member associated therewith and having torque-producing currents created therein.

19. A primary member having an annular winding or windings and pole-pieces interposed between said windings and the face of the member, and a secondary or induced member coöperating therewith and having torque-producing currents created therein.

20. A primary member having an annular winding or windings and radially-extending pole-pieces of alternating polarity circumferentially disposed and extending in front of said winding or windings, and a secondary or induced member associated therewith having torque-producing currents created therein.

21. A primary member having a plurality of pole-pieces overlapping in a radial direction, and a secondary member having torque-producing currents created therein.

22. A primary member having alternating outwardly and inwardly extending pole-pieces which overlap in a radial direction, and a suitable secondary member having torque-producing currents created therein.

23. A primary member having an annular winding or windings and overlapping radially-extending pole-pieces disposed in circumferential position and extending in front of said winding or windings, and a suitable secondary member having torque-producing currents created therein.

24. A primary member having a plurality of polar surfaces and non-magnetic material filling the spaces between said polar surfaces, to prevent cutting of the rubbing surfaces and a secondary member.

25. A primary member having a plurality of circumferentially-disposed polar surfaces and non-magnetic material filling the spaces between the same, and a suitable secondary member.

26. A primary member having a plurality of radially-extending circumferentially-disposed polar surfaces, non-magnetic material filling the spaces between the same, and a suitable secondary member.

27. A primary member having an annular winding or windings, a plurality of overlapping pole-pieces extending in front of the same, non-magnetic material filling the spaces between said pole-pieces, and a secondary member suitably associated therewith.

28. A primary member having a plurality of polar surfaces and non-magnetic material filling the spaces between the same to prevent cutting of the rubbing surfaces, and a secondary member adapted to move in frictional contact with said polar surfaces and non-magnetic filling material.

29. A primary member having an annular winding, a plurality of pole-pieces alternating in polarity and circumferentially disposed and overlapping radially, and a secondary member adapted to move in frictional contact with said primary member.

30. The combination with a primary clutch member provided with suitable polar surfaces, of a secondary clutch member coöperating therewith, said polar surfaces being arranged to constrain the lines of force to travel in the most advantageous paths for producing maximum turning effort.

31. The combination with a primary clutch member having suitable polar surfaces, of a secondary clutch member coöperating therewith, said polar surfaces being disposed to constrain the lines of force to pass in substantially tangential paths in traveling from pole to pole through said secondary member, whereby maximum turning effort results.

32. The combination with a primary clutch member having suitable polar surfaces, of a secondary clutch member coöperating therewith, said polar surfaces being alternately of opposite polarity and having their adjacent edges disposed substantially along radial lines, whereby the lines of force are constrained to travel in substantially parallel paths in passing from pole to pole.

33. The combination in a magnetic clutch or accelerator, of a primary member having a surface composed jointly of magnetic poles and non-magnetic filling to prevent cutting of the rubbing surfaces, and a secondary member having a suitably-opposed surface and adapted to be inductively influenced by the primary member.

34. The combination in a magnetic clutch or accelerator, of a primary member having polar surfaces of alternately opposite polarity and intervening non-magnetic filling to prevent cutting of the rubbing surfaces, and a secondary member having a suitable opposing surface adapted to rest in mechanical contact with the composite surface of said primary member, said secondary member being adapted to be inductively influenced by said primary member.

35. The combination in a magnetic clutch or accelerator, of a suitable driving member and a suitable coöperating driven member adapted to be driven by the combined influence of induction and friction, and an oil-containing casing associated therewith.

36. In a clutch or accelerator, a driving member and a driven member adapted to rest in mechanical contact and adapted to be driven through the combined influence of induction and friction, and a suitable oil-containing casing associated therewith for lubricating the contact-faces of said members.

37. In a clutch or accelerator, the combination with a primary member having a suitable polar surface, of a secondary member adapted to make mechanical contact with said polar surface to be driven through the combined influences of induction and friction, and an oil-containing casing associated with said members for lubricating the contacting surfaces.

In witness whereof I have hereunto subscribed my name in the presence of two witnesses.

HENRY H. CUTLER.

Witnesses:
EDWIN B. H. TOWER, Jr.,
M. R. ROCHFORD.